Oct. 15, 1957   H. J. SMITH   2,809,722
PNEUMATIC SHOCK ABSORBER WITH REBOUND CONTROL
Filed Sept. 9, 1953   2 Sheets-Sheet 2
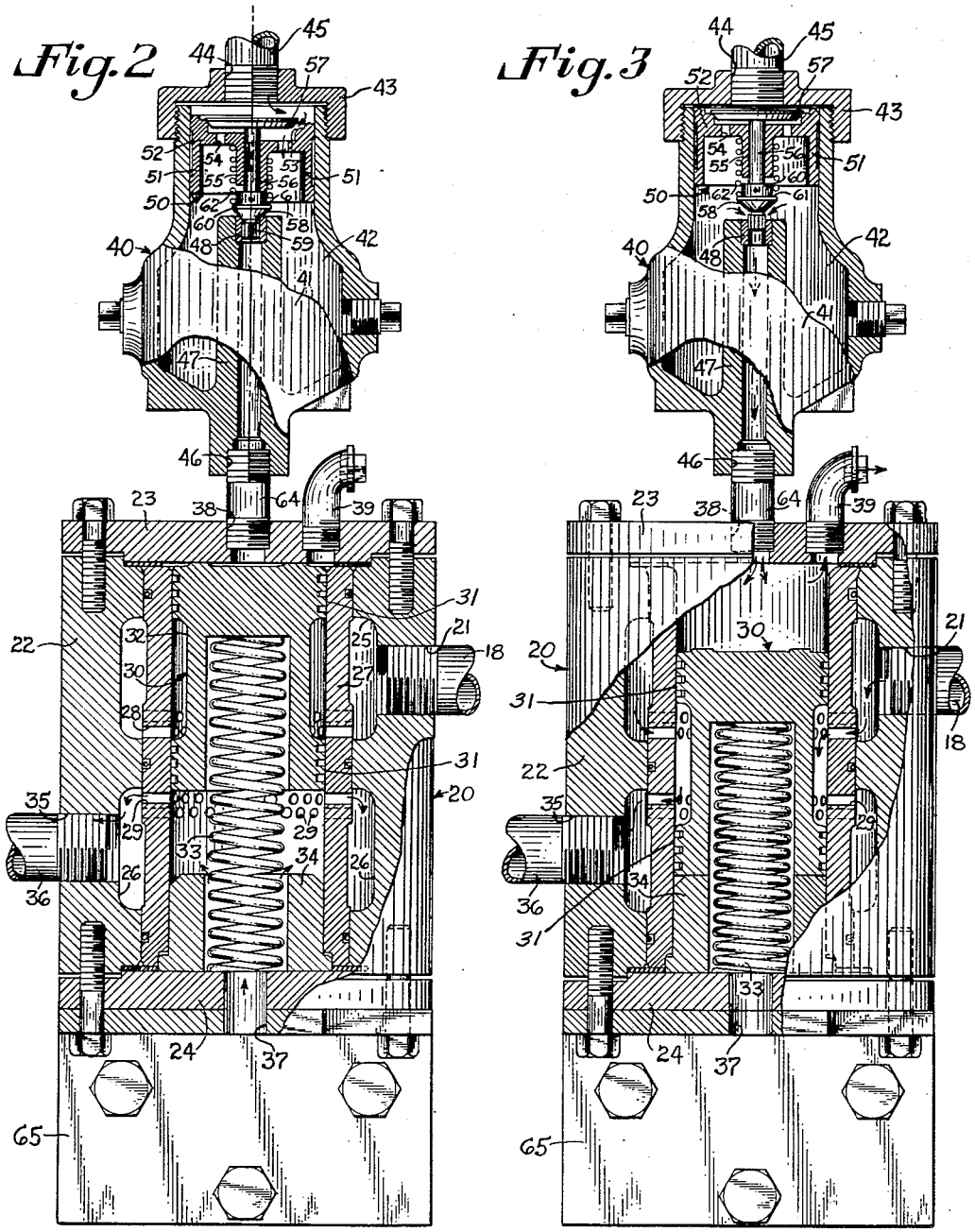
Inventor
Henry J. Smith
By Wayne Morris Russell
Attorney United States Patent Office 2,809,722
Patented Oct. 15, 1957

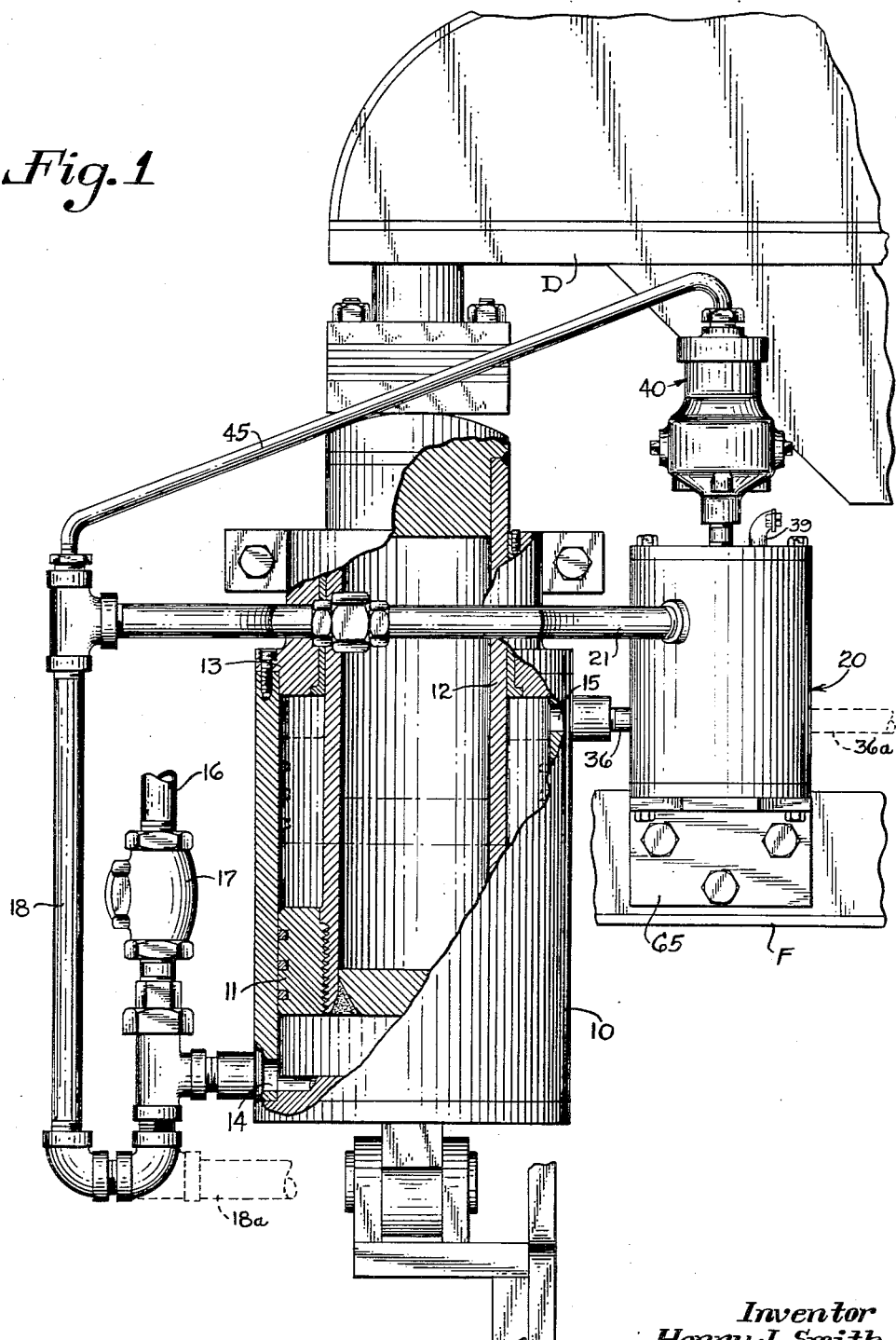

2,809,722

PNEUMATIC SHOCK ABSORBER WITH REBOUND CONTROL

Henry J. Smith, Calumet City, Ill., assignor to Pullman-Standard Car Manufacturing Company, Chicago, Ill., a corporation of Delaware Application September 9, 1953, Serial No. 379,250

11 Claims. (Cl. 188—97)

The present invention relates to a shock absorber for the drop head of a railway track maintenance machine or the like, and more particularly to a pneumatic shock absorber especially adapted to cushion rebound movements as well as shock load movements resulting from continuous and rapid operation of such a drop head.

In the disclosed embodiment of the invention, the piston of an air cylinder is arranged to have its rod engaged by the drop head of such a machine as the head falls from its raised position, so that the piston movement under the shock load is cushioned by compressed air at one end of the cylinder. The opposite ends of the cylinder are in communication through a control valve normally biased to closed position and operable to open position for admitting air under pressure from the one cylinder end to the other by an actuating valve which charges a reservoir with compressed air from the one end during the compressive movement of the piston and discharges the reservoir air, as the pressure at the one end of the cylinder falls upon the start of rebound of the piston, to effect opening of the control valve with consequent admission of compressed air to the other end of the cylinder immediately upon the beginning of rebound movement. The piston rebound is thus slowed and cushioned both by decrease in the rebound-causing pressure at the one cylinder end as a portion of the air is passed to the other side of the piston and by the pressure at the other cylinder end provided by the air so passed.

The invention provides for a very rapid action in effecting the cushioning of the piston rebound, as is necessary because the drop head is operable at a rate of many times a minute, and thus provides a practicable shock absorber meeting the requirements for such service. The shock absorber is self-operating, positive and automatic in action, cushions the rebound in response to the start of rebound movement, and assures that the rebound cushioning will be effected in properly timed relation to the movements of the piston, that is, after the movement caused by shock load has ceased and before termination of the rebound or return movement. Possibility of damage to either the shock absorber or drop head or like device with which the shock absorber is employed due to improper timing or operation of the shock absorber is practically eliminated. At the same time, of course, the shock absorber minimizes the stresses and other damaging effects on the drop head resulting from the repeated rapid rise and fall thereof in operation.

It is an object of the present invention to provide a fluid type shock absorber utilizing fluid placed under pressure in absorption of a shock load to cushion rebound movement.

Another object is the provision of a fluid type shock absorber which utilizes fluid compressed in cushioning of a shock load to cushion rebound movement also by means responsive to reduction of the fluid pressure upon initiation of the rebound movement.

Another object is the provision of a rapidly-acting pneumatic shock absorber for cushioning both compressive and rebound movements of its parts under continuously and rapidly repeated shock loads.

A further object is the provision of a pneumatic shock absorber in which rebound movement after absorption of a shock load is cushioned by air compressed to cushion the movement due to the shock load.

Another object is the provision of a pneumatic shock absorber in which air compressed under shock load to cushion the shock is utilized also to cushion the rebound in response to the start of rebound movement.

Another object is the provision of a pneumatic shock absorber in which air compressed under shock load to cushion the shock is employed to cushion the rebound by flow through quick-acting valve means operated by the compressed air upon start of the rebound.

Another object is the provision of a pneumatic shock absorber in which relative movement of a piston in a cylinder under shock load compresses air at one end of the cylinder to cushion such movement and rebound movement of the piston is slowed and cushioned by transfer of a portion of the compressed air to the opposite end of the cylinder in immediate response to the beginning of rebound movement.

It is another object of the invention to provide a pneumatic shock absorber employing air compressed at one end of a cylinder by relative movement of a piston therein under a shock load to cushion return movement of the piston by conveying a portion of the compressed air to the other end of the cylinder upon the beginning of the return movement and in response to the reduction in pressure occasioned by start of the return movement.

A further object is the provision of a pneumatic shock absorber in which air placed under pressure at one end of a cylinder by relative movement of a piston therein under shock load is transferred to the other end of the cylinder to cushion rebound movement of the piston by means operated by the compressed air.

Another object is the provision of a pneumatic shock absorber structure for a drop head in which the shock-cushioning air compressed at one end of a cylinder by a piston under impact of the drop head is employed also to cushion rebound of the piston by injection into the other end of the cylinder upon start of rebound movement and is further utilized to operate the injection means automatically in response to decrease in its pressure occasioned by the start of the rebound movement.

Other and further objects, advantages, and features of the invention will be apparent to those skilled in the art from the following description, together with the accompanying drawings, in which:

Fig. 1 is an elevational view of one embodiment of a shock absorber structure of this invention, with parts broken away for clearness;

Fig. 2 is an enlarged view, partly in section and with parts broken away, showing the valve for controlling communication between the opposite cylinder ends and the valve for actuating the control valve, the control valve and one half of the actuating valve being shown in their positions during shock-absorbing movement of the piston, and the other half of the actuating valve being shown in neutral or closed position; and Fig. 3 is a view similar to Fig. 2, but showing the valves in their positions upon the start of rebound movement of the piston.

Referring first to Fig. 1 of the drawings, there is shown a cylinder 10 disposed in substantially vertical position having a piston 11 therein with a piston rod 12 projecting through a guide portion 13 at the upper end of the cylinder in position to be engaged by a portion of a falling drop head D. The cylinder is preferably pivotally mounted at its bottom on a suitable support, substantially as shown. Adjacent its bottom end, the cylinder is provided with a port 14, and has a similar port 15 adjacent its upper end. A compressor or the like (not shown) is connected to the port 14 through a suitable conduit 16 having a check valve 17 therein to supply air under a substantially constant pressure to the lower end of the cylinder for resisting downward movement of the piston 11 under impact of the drop head. A pipe 18 or the like in communication with the port 14 extends to a control valve 20 and is connected to an inlet opening 21 thereof.

As best shown in Figs. 2 and 3, the control valve 20 has a cylindrical outer casing 22 closed at its ends by a top plate 23 and a bottom plate 24. Upper and lower annular passages 25 and 26 are provided in the valve as by depressions or grooves formed in the inner face of the casing 22 and spanned by a cooperating cylindrical sleeve 27 so that portions of the outer sleeve surface, with the grooves in the casing, define the passages. A plurality of apertures 28, which may be staggered in two rows as shown, extend from the lower portion of the upper passage 25 to the interior of the sleeve 27, and a plurality of apertures 29 similarly extend through the sleeve from the upper portion of the lower passage 26. Slidably fitting in the upper portion of the sleeve is a valve piston 30 having upper and lower bearing portions 31 engaging the inner face of the sleeve. An annular groove 32 is formed in the outer peripheral face of the piston between the portions 31, of a width sufficient to extend from above the apertures 28 to below the apertures 29 when the piston 30 is disposed in a lowered position in the sleeve 27. The piston is normally held in an upper position against the top casing plate 23 by a spring 33, in this case a helical spring bearing at one end on the bottom casing plate 24 and at the other end against the end face of a recess in the bottom of the piston. In this position, the lower bearing portion 31 of the valve piston lies between the upper and lower apertures 28 and 29 so as to block communication therebetween. Within the lower portion of the sleeve 27 is an annular stop member 34 secured on the bottom plate 24 to limit downward movement of the piston, which may also conveniently provide a seating recess for the lower end of spring 33, as shown. Suitable gaskets or seals are provided between the various parts to prevent air leakage. The inlet opening 21 is located in the upper portion of the casing 22 to communicate directly with the upper passage 25, and a similar outlet opening 35 in the lower portion of the casing extends from the lower passage 26 to the exterior of the casing for connection to a conduit 36 connected to the upper end of the cylinder 10 through the port 15. An exhaust opening 37 in the bottom plate 24 opens the upper end of the cylinder to atmosphere, in normal upper position of the valve piston 30, through the conduit 36, passage 26, apertures 29, and the interior of sleeve 27. In the top plate 23, preferably centered directly over the piston, is an aperture 38 for the connection of the actuating valve as explained hereinafter, and a restricted orifice 39 is also provided in plate 23, as by a choke plug threaded in the plate, for bleeding air under pressure from the interior of the sleeve above the valve piston.

An actuating valve generally designated 40 is mounted adjacent, and preferably directly on, the control valve 20. The valve 40 comprises a hollow valve casing 41 which conveniently provides a reservoir for air under pressure employed to actuate the control valve. The casing has a cylindrical neck portion at its upper end and an enlarged portion below the neck portion and providing therewith a reservoir chamber 42. The upper end of the casing 41 is closed by a cap 43 having a valve inlet 44 to which is connected a conduit 45 leading from and preferably of smaller cross section than the conduit 18, and communicating therethrough with the port 14 of the cylinder. An outlet 46 is provided in the end of the casing opposite the cap and has a tubular extension 47 within the casing terminating short of the upper end thereof. A bushing 48 is secured in the upper end of the extension 47, and has a beveled edge to provide a conical valve seat. A valving piston member 50 is slidably disposed in the neck portion of the casing. The piston member comprises a cylindrical portion 51 slidably bearing on the interior surface of the casing neck portion and having a web 52 intermediate its length. A shoulder is provided along the junction of the inner face of the cylindrical portion 51 and the upper surface of the web 52, and formed with a beveled surface defining a conical valve seat 53 spaced somewhat above the web. The web is provided with a plurality of apertures 54, and has a central tubular guide portion 55 extending downwardly in alignment with the tubular outlet extension 47 but spaced therefrom. Slidable in the piston member guide portion 55 is a stem 56 having a disk valve portion 57 at its upper end seating on the conical valve seat 53 and a conical valve portion 58 at its lower end engaging on the valve seat provided by the bushing 48. Projecting from the conical valve portion 58 is a pilot portion 59 engaging in the bushing and having suitable grooves or other air passages formed therein. At the base of the conical valve portion 58 the stem 56 is provided with an enlarged stop portion 60 of substantially the diameter of the guide portion 55 for limiting relative sliding movement of the piston member 50 and the stem. The base of the conical valve portion extends radially outwardly beyond the stop portion 60 to provide a flange or shoulder 61. A helical spring 62 is engaged at one end against the lower face of the web 52 and about the guide portion 55, and at its other end about the stop portion 60 and against the shoulder 61, to urge the piston member 50 upwardly and the stem 56 downwardly so as to seat the valve portions 57 and 58. While the piston member 50 is free to move in either direction except for the resistance of the spring 62, the valve portions of the valve stem 56 are prevented from moving downwardly by the outlet extension 47. In upward movement, the pilot portion 59 maintains engagement with the bushing 48 to prevent radial displacement of the parts, in cooperation with the guide portion 55 of the piston member, and to guide the valve stem 56 in downward movement for proper seating of the conical valve portion 58 on the bushing. A short section of pipe 64 or the like connects the casing outlet 46 to the aperture 38 in the top plate 23 of the control valve 20, and also serves to mount the actuating valve 40 on the control valve. The valve 20 in turn may be mounted by a suitable bracket 65 on a support such as a portion F of the guide frame for the drop head, as shown in Fig. 1, although in actual practice it is preferable to mount the valves on the machine frame and make connection to the cylinder 10 by hose or like flexible conduit so as to avoid the effect of the drop head vibrations on the valves and connections.

A pair of cylinders 10 are ordinarily provided for easing the drop head shocks, and both may readily be arranged for control by a single valve 20. It is necessary merely to connect the lower end of the second cylinder to the passage 25 of the control valve 20 by a conduit 18a and the upper end to the passage 26 by a conduit 36a, as indicated in Fig. 1 by dotted lines. The conduit 18a is shown as a branch of the conduit 18, while the conduit 36a is shown as connected to another outlet opening in the valve casing 22 similar to the outlet opening 35. It will be obvious, however, that the conduit 18a might be connected directly to the inlet opening 21 or to a similar opening communicating with passage 25, and that conduit 36a might be a branch of conduit 36. More than two cylinders may of course be connected in a similar manner.

In operation, assuming that the drop head D has been brought to its raised position, the piston 11 is lifted to the top of the cylinder 10 by the air under pressure fed through the conduit 16 and port 14. The piston 30 of control valve is in its upper position as in Fig. 2, and the valving piston 50 and valve portions 57 and 58 of the actuating valve 40 are in position closing both the inlet and outlet, as shown in the left half of valve 40 in Fig. 2. The air pressure in the passage 25 of the control valve and in the reservoir chamber 42 of the actuating valve is the same as in the conduits 18 and 45 and in the cylinder 10. As the drop head falls, it engages the upper end of the piston rod 12 and forces the piston 11 downwardly, further compressing the air at the lower end of the cylinder so as to cushion the shock load movement of the piston and absorb the impact of the drop head. This added pressure of course is distributed to the conduits 18 and 45 and valves 20 and 40 through the port 14, but does not affect the pressure in the conduit 16 because of the check valve 17. The pressure has no effect on the valve 20, since the air under pressure is confined to the passage 25 and the space defined between the piston 30 and sleeve 27 by the groove 32. The downward movement of the piston, however, draws air into the top of the cylinder through the exhaust opening 37, sleeve 27, apertures 29, outlet opening 26, conduit 36, and the port 15, the passage of air through the valve 20 being shown by the arrows in Fig. 2. The increased pressure in conduit 45, however, overcomes the force of the spring 62 and causes the piston member 50 of the actuating valve 40 to move downwardly, as shown by the right half of the valve in Fig. 2, so that the valve portion 57 is separated from its seat 53 and air flows from the conduit 45 through the inlet 44, about the valve portion 57, and through the web apertures 54 into the reservoir chamber 42, charging it with air under the higher pressure. The conical valve portion 58 remains seated on the bushing 48 to close the extension 47 and outlet 46 against discharge of air. The flow of air into the valve 40 is indicated by the arrows in the figure. This charging of the reservoir chamber continues as long as the pressure at the lower end of the cylinder is greater than that in the reservoir, or in other words as long as the piston 11 continues its downward compressive movement under the shock load.

In Fig. 1, the piston 11 is shown in substantially the lowermost position to which it has been forced by the impact of the descending drop head, spaced somewhat above the bottom of the cylinder, and just starting its rebound. It will be understood that the extent of downward movement of the piston depends upon the magnitude of the shock load and the pressure of the air supplied to the cylinder 10 through the conduit 16, and that this initial air pressure is determined in accordance with the loads to which the shock absorber is subjected so as to obtain good absorption or cushioning of the piston movement under the shock load. As the piston begins its rebound or return movement under the force of the compressed air at the lower end of the cylinder, the pressure of that air falls both because of the removal of the load and the increased space in the cylinder for containing the air. Immediately upon this decrease in the pressure of the air at the lower end of the cylinder, the now greater pressure of the air which has been forced into the reservoir chamber 42 of the actuating valve forces the piston member 50 upwardly, as shown in Fig. 3, reseating the valve portion 57 and thus closing the inlet 44, and at the same time by engagement with that valve portion lifting the stem 56 to unseat the conical valve portion 59 and open the extension 47 and outlet 46. Compressed air passes from the reservoir chamber 42 through outlet 46 and pipe 64 into the sleeve 27 of the control valve, between the top plate 23 and piston 30, and forces the piston down against the stop member 34, with its upper bearing portion 31 above apertures 28 and the lower bearing portion below apertures 29, as shown in Fig. 3, so that the groove 32 of the piston forms a passage along the inner surface of the sleeve in communication with both apertures 28 and apertures 29, and the lower bearing portion 31 prevents communication between the exhaust opening 37 and the passage 26. Air under pressure flows from conduit 18 through passage 25 and apertures 28 into groove 32 and thence through apertures 29, passage 26, and conduit 36 into the upper end of the cylinder 10 to cushion the return movement of piston 11. The flow of air is indicated by the arrows. The air above the valve piston 30 bleeds out of the valve casing through the restricted orifice 39 to reduce the pressure on the piston, which is also reduced by expansion of the air to fill both the reservoir chamber 42 and the space within the sleeve 27 above the valve piston, so that the air pressure falls below that required to hold the piston 30 in its lower position against the force of spring 33, and the piston is returned to its normal upper position by the action of the spring to shut off flow of air from the lower to the upper end of the cylinder and open the upper end to atmosphere through conduit 36, passage 26, apertures 29, and exhaust opening 37. The compressed air in the upper end of the cylinder 10 is quickly exhausted due to its excess of pressure over atmosphere and the upward return movement of the piston 11, the flow of air through the valve 20 being opposite to that indicated in Fig. 2. The valving structure of actuating valve 40 returns to the normal position closing both the inlet and outlet as the pressure on opposite sides of the piston member 50 comes into balance. The entire action is very rapid, requiring only a fraction of a second.

It will be apparent that the rebound of the piston 11 is slowed and cushioned both by the decrease in air pressure at the lower end of the cylinder as a portion of the air there compressed is transferred to the upper end of the cylinder, reducing the force urging the piston upwardly, and by the action of the transferred air on the upper face of the piston, resisting the upward movement. The pressure per unit area of the opposite faces of the piston is equalized, but the upward pressure is greater than the downward pressure due to the reduction of the upper face area due to the piston rod 12, so that the upward movement of the piston is continuous although progressively slowed or cushioned, and the piston is brought to its uppermost position in the cylinder without any appreciable shock as air is exhausted from above it in the manner explained. As the piston 11 moves upwardly, the pressure of the air below it in the lower end of the cylinder falls due to the enlargement of the space at the lower end and becomes less than the pressure in the conduit 16, so that air under the desired pressure flows through the check valve 17 into the lower end of the cylinder. The piston in its uppermost position is thus supported by air at predetermined pressure, ready to receive the impact of the drop head D as it falls again. As previously mentioned, the drop head of a railway maintenance machine or the like may operate at a rapid rate, often well over thirty times a minute, and the present invention provides a quick-acting shock absorber capable of cooperating properly with the drop head to minimize the stresses to which it is subjected.

What is claimed is:

1. A shock absorber for a drop head, comprising a cylinder, a piston in said cylinder movable toward one end thereof under a shock load, a piston rod for the piston extending through the other end of the cylinder to receive shock loads, means supplying air under pressure to the cylinder at said one end for cushioning movement of the piston under shock load, a control valve having an inlet opening in communication with said one cylinder end and an outlet opening in communication with the other cylinder end and with external atmosphere, said control valve also having a valve element normally preventing communication between the inlet and outlet openings and movable by air pressure to place the inlet and outlet openings in communication and to block the outlet opening from atmosphere, and an actuating valve having a reservoir chamber for air under pressure with an outlet in communication with the control valve to subject the valve element to reservoir chamber air pressure, said actuating valve also having an inlet in communication with said one cylinder end and valve means normally closing the inlet and outlet operable by air pressure in said one cylinder end greater than that in said reservoir chamber to admit air from said one end to the chamber while closing the outlet and operable by air pressure in the chamber greater than that in said one cylinder end to close the inlet and open the outlet for discharge of air under pressure from said chamber to operate said valve element for allowing communication between said inlet and outlet openings to admit air under pressure from said one cylinder end to the other end for slowing rebound of the piston by relief of pressure at said one end of the cylinder and increase of pressure at the other cylinder end, the pressure in said one end of the cylinder being increased by movement of the piston under shock load to provide a pressure higher than that initially in said reservoir chamber and decreased to a level below said higher pressure by start of piston rebound movement to effect said admission of air under pressure to the other end of the cylinder during rebound movement of the piston.

2. A pneumatic shock absorber comprising a cylinder having a port adjacent each end, means for supplying air under predetermined pressure to the cylinder through the port at one end, a piston working in the cylinder, a piston rod extending from the piston through the other end of the cylinder to receive shock loads, conduit means connecting the cylinder ports, valve means controlling said conduit means to open and close communication between the opposite ends of the cylinder through the ports normally biased to position closing communication and opening said other cylinder end to atmosphere operable by air pressure to position opening communication, and valve means for actuating said control valve means having an inlet in communication with said one end of the cylinder, an outlet in communication with the control valve means, reservoir means in communication with both said inlet and outlet interiorly of the actuating valve means, and valving structure normally closing both the inlet and outlet operable by air pressure in said one cylinder end greater than that in the reservoir means to open the inlet for charging the reservoir means while closing the outlet and operable by air pressure in the reservoir means greater than that in said one cylinder end to close the inlet and open the outlet for discharging the reservoir through the outlet to actuate the control valve means to said communication-opening position for admitting air under pressure from said one end of the cylinder to the other to slow rebound of the piston, the air pressure in said one cylinder end exceeding that in the reservoir means upon compressive movement of the piston toward said one end under shock load and falling below that in the reservoir means upon start of piston rebound movement.

3. A pneumatic shock absorber comprising a cylinder having a port adjacent each end thereof, means supplying air under predetermined pressure to one end of the cylinder through the adjacent port, a piston working in the cylinder having a piston rod extending through the other end of the cylinder adapted to receive shock loads for moving the piston toward said one cylinder end to increase the pressure of the air therein, means connecting said ports to provide communication between said one end and other end of the cylinder, a valve controlling communication through said connecting means having means normally biased to position closing the connecting means operable by air pressure to a position opening the connecting means for communication between the cylinder ends, and a valve for actuating the control valve having an inlet and an outlet communicating respectively with said one cylinder end and said control valve and valving means normally closing both the inlet and outlet and also having in communication with the inlet and outlet interiorly thereof a reservoir, said valving means operating upon increase of air pressure in said one cylinder end above that in the reservoir to open the inlet while closing the outlet to charge the reservoir with air under the higher pressure and operating upon decrease of the pressure at said one cylinder end below said higher pressure to open the outlet while closing the inlet to discharge the reservoir for actuating the control valve to said communication-opening position to admit air under pressure from said one end to the other end of the cylinder for cushioning rebound movement of the piston, the air pressure in said one cylinder end falling below that in said reservoir upon start of piston rebound movement.

4. A pneumatic shock absorber comprising a cylinder having a piston therein movable toward one end by a shock load to compress the air at said one end for cushioning the compressive movement of the piston, actuating valve means having an inlet communicating with said one cylinder end and an outlet and including a reservoir in communication interiorly of said valve means with both said inlet and outlet, a valving structure in said actuating valve means normally biased to close both the inlet and outlet and operable by air pressure in said one cylinder end greater than the pressure in the reservoir to open the inlet while closing the outlet for charging the reservoir with air under said greater pressure and operable by decrease in the air pressure in said one end below said greater pressure upon rebound movement of the piston to open the outlet for discharging the reservoir therethrough, and means for placing the opposite cylinder ends in communication including a control valve having valve means normally biased to prevent communication while opening said other cylinder end to atmosphere and operable by said greater air pressure to an open position closing said other end to atmosphere while allowing passage of air under pressure from said one end to said other end, said outlet of the actuating valve means being connected to the control valve for discharge of the reservoir adjacent said valve means to subject the valve means to said greater air pressure for movement thereof to said open position upon rebound of the piston, the air pressure in said one cylinder end being caused to decrease below said greater pressure by the beginning of rebound movement of the piston.

5. A pneumatic shock absorber arrangement comprising a cylinder having a piston therein movable toward one end thereof by a shock load to compress air between one of its faces and said one cylinder end for cushioning compressive piston movement, and external by-pass means for placing said one end of the cylinder in communication with the other end to slow rebound movement of the piston by passage of air from said one end to the other in timed relation to the piston movement, said by-pass means including a valve controlling said communication and a valve for actuating the control valve, said control valve having valve means normally positioned to prevent communication between said cylinder ends and to open said other end to atmosphere and operable by air pressure to open communication between the cylinder ends and close said other end from atmosphere, and said actuating valve having an inlet communicating with said one cylinder end, an outlet communicating with the control valve for applying air pressure to said valve means, a reservoir in communication with said inlet and outlet interiorly of the actuating valve, and a valving member normally positioned to close the inlet and outlet operable by air pressure in said one cylinder end in excess of that in the reservoir to admit air to the reservoir while closing the outlet and operable by air pressure in the reservoir in excess of that in said one cylinder end to open the outlet while closing the inlet for discharge of air under pressure from the reservoir to operate said valve means for admitting air from said one end of the cylinder to the other upon rebound movement of the piston.

6. A pneumatic shock absorber comprising a cylinder having a piston movable toward one end thereof by a shock load to compress the air at said one end for cushioning the compressive movement of the piston, means connecting the ends of the cylinder for communication therebetween, a valve controlling communication through said connecting means normally biased to close the connecting means and operable by air pressure to open the connecting means for communication between the cylinder ends, and a valve for actuating the control valve having an inlet and outlet and valve means normally closing both the inlet and outlet, a reservoir in communication interiorly of said actuating valve with both the inlet and outlet, and means connecting the inlet with said one cylinder end and the outlet with said control valve, said valve means normally closing both the inlet and outlet and being operable by pressure in said one cylinder end greater than that in the reservoir to open the inlet while closing the outlet to charge the reservoir with air under the higher pressure and operable by decrease in air pressure in said one end below said higher pressure in the reservoir to open the outlet while closing the inlet to discharge the reservoir for operating the control valve to allow communication between the cylinder ends for admission of air under pressure from said one end of the cylinder to the other end for cushioning return movement of the piston, the pressure in said one cylinder end decreasing below said higher pressure upon start of return movement of the piston.

7. A pneumatic shock absorber comprising a cylinder having a piston therein movable toward one end by a shock load to compress the air at said one end for cushioning the compressive movement of the piston, and means for cushioning rebound movement of the piston by transfer of air under pressure from said one end to the other to reduce pressure at said one end and increase the pressure at the other end, said rebound cushioning means comprising communication means between the cylinder ends including a control valve normally venting said other end while preventing communication between the opposite cylinder ends and operable to admit air from said one end to said other end, and means responsive to changes in air pressure at said one end for operating the control valve to said air-admitting condition thereof upon lessening of air pressure in said one cylinder end by rebound movement of the piston.

8. A pneumatic shock absorber comprising a cylinder having a piston therein movable toward one end by a shock load to compress the air at said one end for cushioning the compressive movement of the piston, and means for cushioning rebound movement of the piston by transfer of air under pressure from said one end to the other to reduce pressure at said one end and increase the pressure at the other end, said rebound cushioning means comprising communication means between the cylinder ends including control valve means responsive to changes in air pressure at said one end and normally venting said other end while preventing communication between the cylinder ends and operable by lessening of air pressure in said one end upon rebound movement of the piston to admit air under pressure from said one end to the other.

9. A fluid shock absorber comprising a cylinder having a piston therein movable toward one end by a shock load to compress fluid at said one end for cushioning the compressive movement of the piston, and means for cushioning rebound movement of the piston by transfer of pressure fluid from said one end to the other to reduce pressure at said one end and increase pressure at the other end for equalizing the unit area pressure on the opposite faces of the piston, said rebound cushioning means comprising a valve controlling communication between the opposite cylinder ends and a valve for actuating the control valve to admit fluid from said one end to the other as the piston rebound movement begins, said actuating valve having a reservoir in communication therewith to be charged therethrough with pressure fluid from said one cylinder end during compressive piston movement and discharging through the actuating valve upon rebound movement to actuate the control valve to open position admitting fluid from said one end of the cylinder to the other.

10. A fluid shock absorber comprising a cylinder having a piston therein movable toward one end by a shock load to compress fluid at said one end for cushioning said compressive movement of the piston, and means for cushioning rebound movement of the piston by transfer of pressure fluid from said one cylinder end to the other to reduce pressure at said one end and increase pressure at the other end for equalizing the unit area pressure on the opposite faces of the piston, said rebound cushioning means comprising a single valve controlling communication between the opposite cylinder ends and means for actuating the control valve to admit fluid from said one end to the other as the piston rebound movement begins operable by the variation in the pressure of the fluid at said one cylinder end upon compressive and upon rebound movement of the piston to effect actuation of the control valve to said fluid-admitting condition.

11. A fluid shock absorber arrangement comprising a cylinder having a piston therein movable toward one end by a shock load to compress fluid at said one end for cushioning said compressive movement of the piston, and means for cushioning rebound movement of the piston by transfer of pressure fluid from said one cylinder end to the other to reduce pressure at said one end and increase pressure at the other end, said rebound cushioning means comprising a valve controlling communication between the opposite cylinder ends, means for actuating the control valve to admit fluid from said one end to the other upon beginning of piston rebound movement operable by predetermined pressure of the fluid at said one end to actuate the control valve for said admission of fluid, and means to operate the control valve for interrupting fluid flow from said one end to said other end and relieving the pressure at said other end prior to termination of the piston rebound movement.

References Cited in the file of this patent

UNITED STATES PATENTS

| | | |
|---|---|---|
| 1,244,752 | McCrosson | Oct. 30, 1917 |
| 1,522,243 | Hughes | Jan. 6, 1925 |
| 2,018,312 | Moulton | Oct. 22, 1935 |
| 2,265,099 | Chenault | Dec. 2, 1941 |
| 2,293,915 | Patterson | Aug. 25, 1942 |